United States Patent
Mitra et al.

(10) Patent No.: US 10,910,638 B2
(45) Date of Patent: *Feb. 2, 2021

(54) METHOD OF MAKING HARD CARBON MATERIALS

(71) Applicant: Farad Power, Inc., Sunnyvale, CA (US)

(72) Inventors: Shantanu Mitra, Hillsborough, CA (US); Vinod Nair, Coraopolis, PA (US)

(73) Assignee: Farad Power, Inc, Sunnyvale, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 16/120,046

(22) Filed: Aug. 31, 2018

(65) Prior Publication Data

US 2018/0375093 A1 Dec. 27, 2018

Related U.S. Application Data

(63) Continuation-in-part of application No. 15/242,113, filed on Aug. 19, 2016, now Pat. No. 9,938,152, and a continuation-in-part of application No. 15/208,336, filed on Jul. 12, 2016, now Pat. No. 9,916,938.

(60) Provisional application No. 62/605,903, filed on Sep. 1, 2017.

(51) Int. Cl.
| | | |
|---|---|---|
| C01B 31/02 | (2006.01) | |
| H01M 4/36 | (2006.01) | |
| C04B 35/524 | (2006.01) | |
| C04B 35/64 | (2006.01) | |
| H01M 4/587 | (2010.01) | |
| H01M 10/0525 | (2010.01) | |
| H01G 11/32 | (2013.01) | |
| H01G 11/50 | (2013.01) | |
| C01B 32/05 | (2017.01) | |
| C04B 35/52 | (2006.01) | |
| H01G 11/86 | (2013.01) | |
| H01M 4/133 | (2010.01) | |
| H01M 4/1393 | (2010.01) | |
| H01M 4/02 | (2006.01) | |
| H01M 4/38 | (2006.01) | |
| H01M 4/485 | (2010.01) | |
| H01M 10/054 | (2010.01) | |
| H01M 4/134 | (2010.01) | |
| H01M 4/131 | (2010.01) | |

(52) U.S. Cl.
CPC ............. *H01M 4/364* (2013.01); *C01B 32/05* (2017.08); *C04B 35/52* (2013.01); *C04B 35/524* (2013.01); *C04B 35/64* (2013.01); *H01G 11/32* (2013.01); *H01G 11/50* (2013.01); *H01G 11/86* (2013.01); *H01M 4/133* (2013.01); *H01M 4/1393* (2013.01); *H01M 4/587* (2013.01); *H01M 10/0525* (2013.01); *C01P 2002/02* (2013.01); *C01P 2006/12* (2013.01); *C01P 2006/40* (2013.01); *C04B 2235/3203* (2013.01); *C04B 2235/3234* (2013.01); *C04B 2235/349* (2013.01); *C04B 2235/422* (2013.01); *C04B 2235/428* (2013.01); *C04B 2235/5436* (2013.01); *C04B 2235/6562* (2013.01); *C04B 2235/6567* (2013.01); *C04B 2235/761* (2013.01); *C04B 2235/77* (2013.01); *C04B 2235/80* (2013.01); *C04B 2235/96* (2013.01); *H01M 4/131* (2013.01); *H01M 4/134* (2013.01); *H01M 4/386* (2013.01); *H01M 4/485* (2013.01); *H01M 10/054* (2013.01); *H01M 2004/021* (2013.01)

(58) Field of Classification Search
CPC ...................................................... C01B 32/05
See application file for complete search history.

(56) References Cited

U.S. PATENT DOCUMENTS 5,744,510 A * 4/1998 Pekala .................... C01B 32/00
264/29.1
9,938,152 B2 * 4/2018 Mitra ................... B01J 20/3078

* cited by examiner

*Primary Examiner* — Stuart L Hendrickson
(74) *Attorney, Agent, or Firm* — Geeta Kadambi; Riddhi IP LLC

(57) ABSTRACT

A non-amorphous hard carbon material, synthesized from Furan-ring containing compounds, is described. These non-amorphous hard carbon materials have a $d_{002}$ peak in their X-ray diffraction patterns, corresponding to an interlayer spacing of >3.6 Å, along with a prominent D-band peak in their Raman spectra. BET surface area values between 2 $m^2/gm$ and around 100 $m^2/gm$ can be obtained by controlling the processing parameters of temperature, time and heating rate. The higher surface area HCs—in Li-ion and Na-ion anode configurations—are capable of high charging rates up to 100 C with a cycle life of up to 1000 cycles. Composites of these non-amorphous hard carbons with silicon and lithium compounds are also disclosed.

13 Claims, 12 Drawing Sheets

METHOD OF MAKING HARD CARBON MATERIALS

CROSS-REFERENCE TO RELATED APPLICATIONS

This application is an utility application of provisional U.S. application No. 62/605,903 filed on Sep. 1 2017 and is a continuation in part of and claims the benefit of U.S. application Ser. No. 15/208,336 filed on 12 Jul. 2016 and now a U.S. Pat. No. 9,916,938, and U.S. application Ser. No. 15/242,113 filed on 19 Aug. 2016 now a US patent 993812, the contents of which are incorporated in their entirety.

FIELD OF TECHNOLOGY

This disclosure generally relates to a method of making a carbonaceous material for use as anodes in rechargeable energy-storage devices like lithium-ion batteries (LIBs), lithium-ion capacitors (LICs), and emerging technologies like sodium-ion batteries (NIBs).

BACKGROUND OF THE INVENTION

Lithium ion batteries (LIBs) have been in use since the early 1990's and their capacity to store charge has been steadily improved by using new materials for the electrodes. The different materials considered for LIB anodes can generally be classified into three broad categories based on the mechanisms of operation: (a) insertion/de-insertion mechanisms (carbon-based materials and Ti oxides); (b) alloying/de-alloying mechanisms (using metals like Si, Ge, Sn, Sb, etc.), and (c) conversion materials (metal oxides/sulfides/nitrides). The key performance metrics for anode materials in LIBs are the following: specific capacity (in mAh/gm)—both irreversible (lost after 1st cycle) and reversible, rate capability (e.g. fast charging), cycle life (total number of cycles of reversible capacity before degradation) and density (which determines the volumetric capacity). Although the alloying/de-alloying mechanisms group includes metals that show some of the highest specific capacity (e.g. Si capacity of 4212 mAh/gm), it suffers from dendrite formation during charging, which usually leads to breaking of separators and shorting of cells, volume expansion during charge/discharge cycles and short cycle life (Goriparti, S., et al., 2014). These safety issues have prevented widespread use of materials from this group as anode materials for LIBs.

Overall, carbon materials using the insertion/de-insertion mechanism are the most popular anode materials today, as they present an acceptable combination of performance characteristics. Of these, graphite has a theoretical maximum capacity of 372 mAh/gm, lower than that of the metals/alloys, but its other characteristics—like its longer cycle life, good coulombic efficiency and rate capability—make it a popular material for LIB anodes today. However, the main drawback of graphite is its relatively low specific capacity (typically 300 to 350 mAh/gm), making it more suitable for low-power devices like consumer electronics, but not for more demanding high-power applications like xEVs (pure/hybrid-electric vehicles). Additionally, improvements in the capacity of the cathode materials are also driving the need for higher capacity anodes. Other forms of carbonaceous materials with greater capacity values than graphite—specifically 'hard carbons' (HC)—are promising, due to their combination of higher reversible capacity, good safety characteristics, and long cycle-life.

The term 'hard carbon' is used to describe carbon materials that are not 'graphitized', i.e. they lack the extended 3D crystalline structure of graphite, yet are not amorphous like the activated carbons. Micro structurally, they are a collection of micro-graphitic segments up to a few graphene layers high and between 10 and 40 Å in the planar (graphene) dimensions (Irisarri, E., et al., 2015). It has been suggested that the formation of these micro-graphitic regions is determined by the heat treatment of the carbonaceous precursors in two stages: (i) porosity created by volatile compounds released during the carbonizing (500-800° C. range) and (ii) subsequent high temperature treatment (900-1200° C.). If, during these heating stages, the carbonaceous precursor goes through a liquid phase then, it has been proposed (Tamashausky, A. V., 2006) that the micro-graphitic segments can aggregate and align themselves in a semi-ordered structure that can anneal during the subsequent high-temperature heat treatment into a graphite-like ordered structure. Alternatively, if the micro-graphitic segments remain substantially non-aligned with each other, the hard carbon structure is formed.

One of the implications of the lack of graphitization of the hard carbons is that its inter-planar spacing between the individual graphene layers ('c/2', where 'c' is the lattice parameter in the direction perpendicular to the graphene planes)—as measured by x-ray diffraction (XRD) studies—tends to be larger than that of graphite. Specifically, the corresponding $d_{002}$ peak in a powder x-ray diffraction pattern is a very sharp peak at around 3.37 Angstroms (Å) for graphite (Tianchan, J., et al., 2017), corresponding to a 2theta (2θ) value of 26.5° (when measured with Cu $K_\alpha$ sources). Hard carbons have generally been measured with a $d_{002}$ spacing of 3.6 Å and higher, and have smaller peak intensities, along with broader peaks (full width at half maximum FWHM—of several degrees, on an intensity vs. 2θ plot). This is significant from the perspective of intercalation of Li-ions and Na-ions into the carbon anode—since a larger $d_{002}$ spacing results in a larger capacity to intercalate Li ions (Dai, S., et al, 2011). Furthermore, for the emerging Na-ion battery technology, graphite is not able to intercalate Na-ions, while hard carbons with larger $d_{002}$ spacings can do so. Moreover, analysis of the peak broadening of the $d_{002}$ peak, using the Scherrer equation (Scherrer, P., 1918) results in an estimate of the size of the microcrystalline regions in the planar graphene dimension. On the other hand, activated carbons—used for supercapacitor electrodes and other liquid and vapor phase adsorption applications—are also non-graphitic but amorphous in nature, and have very different XRD patterns (namely, missing the $d_{002}$ peak).

A comparison of XRD patterns from activated carbon, hard carbon and graphite is shown in FIG. 1 (using Cu $K_\alpha$ radiation). The most prominent peak for both graphite and hard carbon is the (002) peak. Graphite ("Gramax" brand from Osaka Gas Chemical, Japan) has a sharp peak centered around 26.5° (2θ) which corresponds to a 'd' spacing of 3.37 Å (where the $d_{002}$ spacing is interlayer spacing between the graphene sheets that comprise the graphite structure, i.e. the c/2 dimension). The XRD pattern obtained for the activated carbon (MSP-20 brand from Kansai Coke & Chemicals, Japan) does not show any (002) peak whatsoever. The hard carbon pattern is from a material obtained using the methods described in this disclosure. The peak position is located at a 2θ angle of 24.3°, which corresponds to a d-spacing of 3.73 Å. Meanwhile, all three materials show a peak corresponding to the (101) plane centered between 43° and 45°. Clearly, the presence, shape and position of the $d_{002}$ peak in an XRD are characteristics of hard carbons, which also allow them to be clearly distinguished from graphite and amorphous activated carbons.

Another key characteristic of hard carbon materials is measured via Raman spectroscopy which measures the scattering of monochromatic light with molecular vibrations and phonons of the carbon solid. The Raman spectrum for graphite exhibits two main modes, which can be seen at 1355 cm$^{-1}$ (D-band) and 1579 cm$^{-1}$ (G-band)—for a source radiation of 532 nm [Kondratowicz, I., et al., 2015]. The peak at 1579 cm$^{-1}$ is a 'G'raphitic band corresponding to in-plane C-C vibrations; while the peak at ~1355 cm$^{-1}$ is a 'D'isordered band corresponding to a mode that is present only when symmetry is broken (i.e. when there is disorder and lattice defects in the structure, like in the case of hard carbons). For pure bulk graphite powder, the D peak tends to be much smaller than the G peak. The ratio of the intensity of the D and G bands ($I_D/I_G$) is then taken as a measure of the disorder or non-graphitic nature of the material (higher ratio=more hard-carbon-like, lower ratio=more graphite-like). Typical values of the Raman shift for the D and G peaks, along with the $I_D/I_G$ for graphite are shown in Table 1 (Tianchan, J., et al., 2017). The D and G peaks in hard carbons are not sharp and well-defined peaks—indicating that there are contributions of lattice imperfections and different functional moieties of the material. The more appropriate $I_D/I_G$ ratio would then be to use the integrated area of each peak—instead of the peak intensity. A typical example of Raman spectra data for hard carbon is also shown in Table 1 (Ajuria, J., et al., 2017), which highlights the large difference in the ratio of D-band and G-band intensities.

TABLE 1

| Carbon type | Raman peak position (cm$^{-1}$) | | Ratio |
| --- | --- | --- | --- |
| | D | G | $I_D/I_G$ |
| Graphite | 1341 | 1565 | 0.113 |
| Hard Carbon | 1340 | 1580 | 1.62 |

From the discussion above, it can be seen that a carbon with a large $I_D/I_G$ ratio (>1) is clearly not graphitic, while the presence of a $d_{002}$ peak in the XRD pattern indicates that it is not amorphous. A combination of these two thus characterizes a hard carbon.

Finally, specific surface area (SSA) of hard carbons—in m$^2$/gm—is also a key characteristic. There are two view points in the scientific literature about the role of the surface area of the anodes being used in the LIBs. On the one hand, lower surface area (<10 m$^2$/gm) is preferred because it will lead to fewer Li ions being trapped in the so-called Solid Electrolyte Interphase (SEI) layer that forms between the carbon and the electrolyte immediately after the first cycle. This is important for high energy devices that are optimized for high storage capacity. On the other hand, a somewhat higher surface area (>100 m$^2$/gm) is preferred to facilitate the transport of lithium and Na ions in LIBs and NIBS, respectively. This aspect optimizes the anodes for fast charging applications. Thus, a flexible technology that allows the fabrication of both low (<10 m$^2$/gm) and high (>100 m$^2$/gm) SSA values in the hard carbon, is desired.

Specific surface area of carbons for anode applications is typically measured by N$_2$ adsorption isotherms using the BET method (Brunauer, S., et al., 1938). N$_2$ adsorption also provides pore size and pore volume estimates for pore sizes in excess of 1 nm—based on a number of physical adsorption models. The most common among these is the NLDFT (non-local density functional theory) [Jagiello, J., et al., 2013].

One of the early HCs on the market was produced from a petroleum pitch precursor material by Kureha Corporation of Japan (Shimizu, K., et al., U.S. Pat. No. 7,718,307). This material had a $d_{002}$ spacing greater than 3.55 Å, and a capacity of up to 481 mAh/gm—when used as anodes (counter electrode: Li metal). Testing was performed by charging and discharging in the voltage range of 2.5-4.2 V, at a maximum rate of 1 C (i.e. a current value required for charging in 1 hour). No information is available on whether or not this hard carbon is suitable for higher C-rates required for fast charging applications (e.g. up to 100 C, i.e. a current value required for charging in $1/100^{th}$ of an hour). Also, BET surface area of this carbon was reported to be between 2 and ~7 m$^2$/gm, although no information is available on whether this process can also result in a HC with a higher SSA (preferred for fast charging applications). Hence a more flexible method that can achieve SSA from ~2 m$^2$/gm to >100 m$^2$/gm, with fast charging-discharging capability in the range of 100 C is desired.

Natural sources like coconut shells (Iwaza, T., 2017) have also been used to make HCs. The coconut-shell char was first carbonized and then chemically treated, followed by an HCl acid washing treatment and finally a chemical vapor deposition (CVD) treatment under a hydrocarbon/N$_2$ atmosphere. A capacity of up to 530 mAh/gm was measured in LIB anode applications, but the process to manufacture this HC from coconut-shell char is complex. Specifically, the HCl treatment requires heating the material under an HCl atmosphere—which needs special equipment and handling. Next, the CVD treatment is performed under hydrocarbons and N$_2$ atmospheres. This also adds an additional step and complexity to the manufacturing process. A simpler process of make HCs is desired.

Other precursor materials used for HC synthesis include sugars (glucose, fructose, sucrose) and similar organic precursors. Pyrolysis of sugar at 1100° C. was used to make HC for NIB anodes [Ponrouch, A., et al., 2012]. Pyrolysis of sucrose at 1100° C. has also been used to fabricate HC with a $d_{002}$ spacing of 3.93 Å, a micro-graphitic domain thickness of 2.9 graphene layers (average) and a BET specific surface area of 137 m$^2$/g [Luo, W., et al., 2015]. Vacuum pyrolysis (<10 mTorr) of sucrose at 1050° C. has also been used to make HCs (Buiel, E., 1998). However, the theoretical maximum yield of HC from a sucrose precursor ($C_{12}H_{22}O_{11}$) is 36 wt. %. A precursor material with a higher theoretical maximum carbon yield is desired.

Furan-ring compounds (comprising a 5 member ring with 4 carbon atoms and 1 oxygen atom) like furfuryl alcohol ($C_5H_6O_2$)—have a theoretical carbon yield of >61% —and are attractive precursors for HCs. Nishi, et al. (U.S. Pat. No. 4,959,281) use furfuryl alcohol to make a HC with a $d_{002}$ spacing of 3.8 Å suitable for LIB anodes, resulting in a reversible capacity of 320 mAh/gm. Furfuryl alcohol is polymerized using an 85% phosphoric acid solution in water—by heating the furfuryl alcohol/phosphoric acid mixture over a lukewarm water bath. Next, a 1N NaOH solution is added to this viscous polymer (no details of initial water bath temperature or mixing criterion for NaOH solution, are provided). Next, after enough NaOH solution is added to bring the pH to 5, the unreacted furfuryl alcohol and excess water are removed by vacuum distillation. Maintaining the pH is involved since this requires preventing loss of water during the initial heating operation (so the setup must include some sort of refluxing equipment). Furthermore, removal of the viscous unreacted liquid—especially with refluxing equipment involved—can be difficult/complicated and often incomplete. This is followed by carbonizing at 500° C. and a high temperature treatment at 1100° C. The overall process is complex. A simpler method is desired.

Imoto, et al. (U.S. Pat. Nos. 5,643,426, 56,716,732) describe a method to make a non-graphitizable HC with a $d_{002}$ spacing greater than 3.7 Å by heating furfuryl alcohol under a constant low pressure of 20 kPa up to a temperature of 1200° C. This carbon was shown to have a capacity of 403 mAh/g (LIB applications). However, this method of making hard carbon from furfuryl alcohol is also complex, since maintaining a 20 kPa vacuum during carbonization—a process that involves significant outgassing—is not easy. Imoto et al. also showed that when heating was done under regular atmospheric pressure, the resulting carbon was sub-optimal (only 282 mAh/gm capacity)—thereby requiring the overpressure as an integral part of the process. A simpler method that does not need special pressure environments is desired.

Azuma et al. (in U.S. Pat. No. 5,093,216) describe a process whereby furfuryl alcohol is mixed with maleic anhydride and water and heated by refluxing over a hot water bath to get a viscous polymer. This viscous liquid is then vacuum-distilled to remove unreacted furfuryl alcohol and water, and then mixed with a concentrated phosphoric acid solution. The mixture was then carbonized at 500° C. under $N_2$, followed by a high temperature treatment of 1200° C., to result in a carbon with $d_{002}$ value greater than 3.82 Å, a density value of 1.55 gm/cc and a phosphorous content of 1.4 wt. %. Subsequent testing in a LIB cell configuration (with $LiCoO_2$-based cathodes), resulted in 380 mAh/gm capacity over 80 charge/discharge cycles. The large $d_{002}$ spacing (3.82 Å) was attributed to the presence of phosphorous. A variation of this method, described by Omaru et al. (U.S. Pat. No. 5,294,498), mixes the phosphoric acid with the viscous polymer and sinters the combination directly at 1200° C. (effectively combining the carbonization and high temperature steps)—with similar results for capacity and $d_{002}$ spacing. In both these methods, the presence of phosphorous is critical in increasing the $d_{002}$ spacing and consequently the Li intercalation capability—resulting in capacity value greater than that achievable by graphite, although it is not clear whether the phosphorous has any other deleterious effect on impedance, long term cycle life, etc. A pure HC with high $d_{002}$ spacing that is capable of Li ion intercalation without the addition of other elements is desired.

Earlier, we have described a process to synthesize a high-surface area activated carbon from furan-functional group materials like furfuryl alcohol (U.S. patent application Ser. No. 15/242,113, now U.S. Pat. No. 9,975,778). We describe a method to polymerize furfuryl-functional-group containing liquid starting materials with catalysts like organic acids (combination of oxalic acid, tartaric acid and maleic acid), along with conductive carbon additives in the 1-3 wt. % range. Polymerization was carried out at room temperature, followed by heating steps to carbonize and activate, and resulted in activated carbons with surface areas as high as ~2500 $m^2/gm$. We describe here a variation of this method that results in the formation of hard carbons with very different characteristics than the activated carbons. The most striking difference is the overall specific surface area measured for HCs derived from furfuryl alcohol—with values between 3 $m^2/gm$ and ~300 $m^2/gm$. This is also accompanied by a significant increase in the density of the carbon (from ~0.6 gm/cc for activated carbons to >1.2 gm/cc for the HCs).

Recently, there has also been a lot of interest in the development of HC composites with additives that improve LIB anode capacity even further—specifically, carbon/silicon (Si) composites—since Si has a high theoretical capacity of 4200 mAh/g (when lithiated to Li4.4 Si). Besides other favorable characteristics, like increased cell voltage, high energy density and insolubility in the electrolyte, Si also suffers from a few drawbacks. Primarily, there is a large capacity-fading due to the variation in the anode volume during the charging and discharging process (lithiation of Si to Li4.4Si, results in a volume expansion of greater than 400%), leading to cracking and eventual loss of the electrical conductivity. These problems can be alleviated by using carbon-silicon composite materials, with silicon concentrations between 10% and 20%.

Several approaches are being investigated to achieve these C/Si composites and they can be generally grouped into 3 categories: (i) deposition/growth of one of these materials on the other (e.g. chemical vapor deposition of carbon on Si nano-wires described in U.S. Pat. No. 8,450, 012; Si nano-wire growth on graphite substrates described in U.S. Pat. No. 9,812,699); (ii) mixing solid carbon/graphite particles with Si nano-structures (e.g. mixing etched Si nano-wires with carbon black as described in U.S. Pat. No. 9,553,304; mixing graphene with Si nano-particles as described in U.S. Pat. No. 9,634,315; and mixing graphite, carbon black and Si particles as described in U.S. Pat. No. 9,553,303); and (iii) using polymer chemistry to synthesize the carbon with embedded Si (e.g. use of the resorcinol/formaldehyde condensation reaction as described in US patent application 20130252082A1, which results in a HC with SSA of >100 $m^2/gm$ only). There is a need safer (without the use of hazardous chemicals like formaldehyde) and simpler (without complicated chemical vapor deposition techniques) methods of making HC/Si composites.

SUMMARY OF THE INVENTION

The process disclosed here involves room temperature polymerizing of furan-ring containing liquid chemicals, also referred to as furfuryl-functional-group-containing liquids, using a catalyst. Precursor materials include furfuryl alcohol, furfuraldehyde, 5-hydroxymethylfurfural, 5-methylfurfural, and other furfuryl alcohol containing compounds like poly furfuryl alcohol (PFA) resins; while catalysts include oxalic acid, tartaric acid, maleic acid, citric acid, benzoic acid, formic acid and other organic acids (all of them being weaker than oxalic acid). In another embodiment, a slower-polymerizing furfuryl-functional-group-containing precursor like 2-acetylfuran, is polymerized using stronger catalysts (at least one of a group including tetrachlorosilane, dichlorosilane, trichlorosilane or dichlorodimethylsilane). Similarly, slower polymerizing PFA resins are polymerized using stronger acids like nitic acid ($HNO_3$). Once an initial polymerized solid is obtained, it is further heated under air at temperatures up to 200° C. to complete the polymerization and cross-linking process. Intermediate temperatures used during this step include heating at one or more of the following: 60° C., 70° C. 80° C., 90° C. and 120° C. Depending on which temperatures are used, the characteristics of the final HC can be influenced to result in either a very low SSA of ~2 $m^2/gm$ or a high SSA value of ~100 $m^2/gm$ and above. Next, the polymerized solid is carbonized at temperatures up to 800° C. —using a slow temperature ramp rate. The ramp rates are lower than 5° C./min, ideally close to 2° C./min. Faster temperature ramps can be used, but these are then accompanied by an intermediate baking step at around 360° C. Finally, an optional calcination treatment at >1000° C. under inert atmosphere, is applied. Additionally, following carbonization, the carbon can be exposed to high-temperature $CO_2$ or steam environments to create some porosity. Since the carbon is of the HC variety, this step does not have the same effect as a traditional activation process would have on a soft/activateable carbon, i.e. create micro and meso pores and SSA>1000 $m^2$/gm—up to 2500 $m^2$/gm. Instead, only a small increase in SSA occurs (up to ~200 $m^2$/gm) accompanied by an increase in sub-micro pores (mostly in the 8 Å and below range). In another embodiment, the carbonization treatment is combined with the high temperature calcination step, when the additional $CO_2$ or steam treatment is not used. The carbon is then milled to a particle size between 5 and 10 μm, in preparation for anode fabrication using standard methods prevalent in the industry or Li-ion and Na-ion battery and capacitor devices.

In another embodiment, the precursor furan-ring compounds are mixed with a silicon-containing material (either pure Si particles or Si compounds) and then polymerized using the same techniques as described above. The subsequent treatments for carbonizing and calcination are also the same as described above. The final carbon shows clear characteristics of HC—with a pronounced $d_{002}$ peak in the XRD patterns and large 'D' band peaks in the Raman spectra. This Si-containing carbon is then milled to a particle size between 5 and 10 μm, in preparation for LIB and NIB anode fabrication using standard methods prevalent in the industry.

In yet another embodiment, the precursor furan-ring compounds are mixed with a lithium compound (e.g. $Li_4Ti_5O_{12}$ (LTO), which is also a well-known anode material) and then polymerized using the same techniques as described above. Carbonizing and calculation are also done as described above. The final material is a composite of HC and LTO. This LTO-containing carbon is then milled to a particle size between 5 and 10 μm, in preparation for LIB and NIB anode fabrication using standard methods prevalent in the industry.

DETAILED DESCRIPTION

Unless defined otherwise, all technical and scientific terms used herein have the same meaning as commonly understood by one of ordinary skill in the art to which this invention belongs. Although any methods and materials similar or equivalent to those described herein can be used in the practice or testing of the present application, the preferred methods and materials are now described. All publications mentioned herein are incorporated herein by reference to disclose and describe the methods and/or materials in connection with which the publications are cited.

The process described in this disclosure is a room-temperature (22-25° C.) polymerization of furan-ring containing liquid precursor materials, followed by heating to complete polymerization and cross linking—without any special refluxing or vacuum distillation set-ups. Polymerization is catalyzed by using catalysts that dissolve in the precursor liquid. One category of catalysts is a group of weak organic acids like oxalic acid, maleic acid, tartaric acid, benzoic acid, citric acid, formic acid and similar compounds. These organic acids are characterized by having acid dissociation constants (pKa) values that are greater than that of oxalic acid (which has a pKa value of 1.23). We have used these organic acids in powder form (i.e. dissolving in the furan-ring compounds) or first dissolving them in DI-water, and then mixing with the furan-ring compounds. The furan-ring compounds included in this group are furfuryl alcohol, furfuraldehyde, 5-hydroxymethylfurfural, 5-methylfurfural, and poly furfuryl alcohol (PFA) resins. The ratio of catalyst to precursor furan ring containing liquid is generally between 5 wt. % and 12 wt. %—depending on the specific type of catalyst (if only oxalic acid is used, then the wt. % is closer to the lower end, while use of weaker catalysts requires the higher end of the wt. %).

In one embodiment, 440 gm of furfuryl alcohol #249106, from Sigma Aldrich, St. Louis, Mo.) was mixed with 44 gm of a combination of organic acid catalysts (oxalic acid, maleic acid and tartaric acid, in a 1:1:1 molar ratio). Once the catalysts are dissolved, the mixture is allowed to soak at room temperature, under air. The objective here is to polymerize the precursors in such a way that it promotes the formation of a non-graphitizable carbon, i.e. encourages the formation of only micro-graphitic crystalline domains which is characterized by a high $I_D/I_G$ ratio (from Raman spectroscopy). At the same time, the polymerization (and subsequent carbonization process) should also ensure that an amorphous carbon does not form—as indicated by the absence of a $d_{002}$ peak in an XRD measurement ($d_{002}$ peaks of >3.6 Å are indicators of the presence of hard carbons—which are neither graphite nor amorphous carbon).

Figure 1:
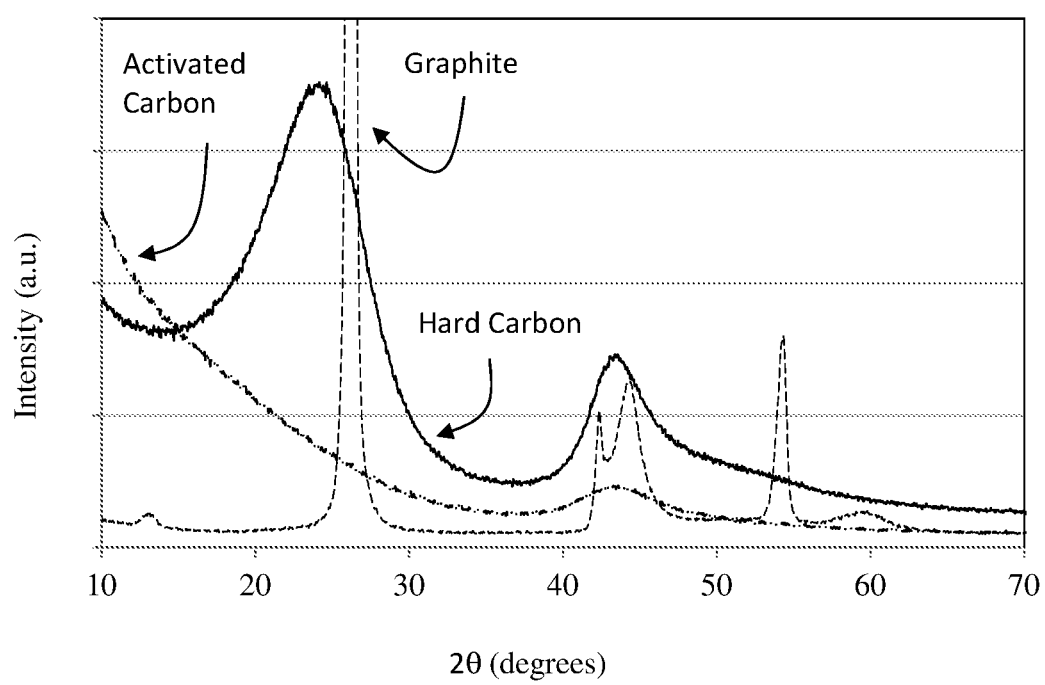
FIG. 1: X-ray diffraction (XRD) plot of intensity versus 2θ (from 10° to 70°) for graphite, activated carbon and hard carbon.
Figure 2:
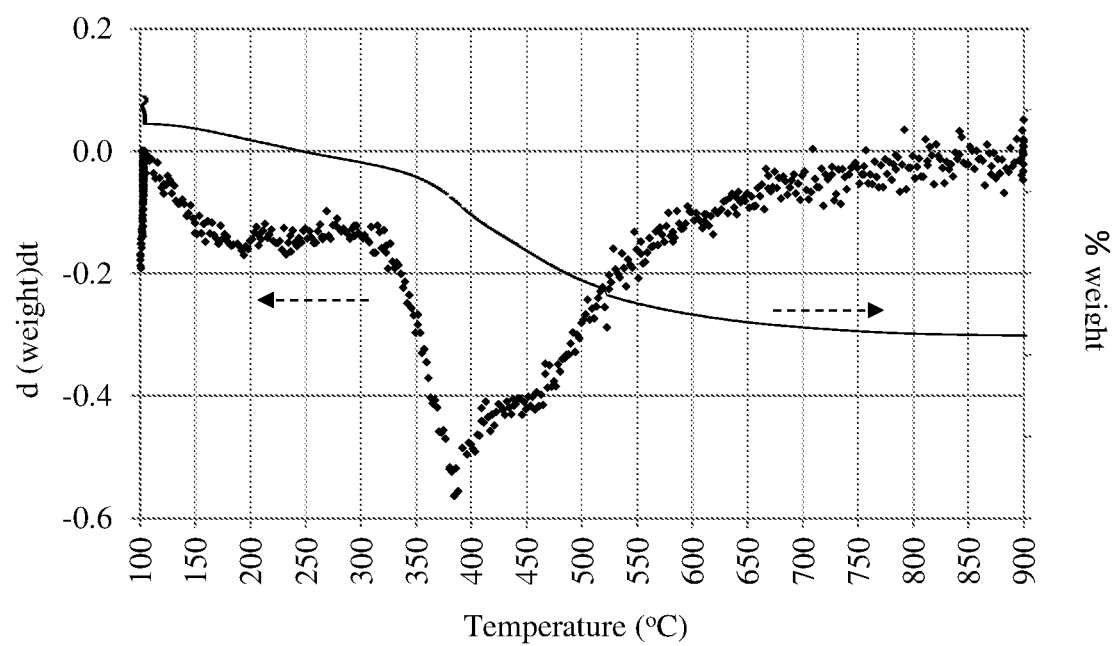
FIG. 2: Thermal gravimetric analysis (TGA) of a room-temperature polymerized furfuryl alcohol resin (from 100° C. to 900° C., @ 10° C./min)

To achieve this objective, the mixture is soaked at room temperature until a pasty solid (held its shape when inverted) is obtained—signifying progress of the polymerization reaction. The weight of the mixture was tracked, along with rate of weight loss which decreased over time, until it approached zero, at which point the pasty solid was formed. Thermogravimetric analysis (TGA) of this material is shown in FIG. 2, for a heating rate of 10° C./min from 100° C. to 900° C. Referring to the d(W)/dt versus temperature curve, one can see changes below 200° C., and again a sharp peak between 350° C. and 400° C. The reactions below 200° C. are related to the polymerization reaction, and inform our choice of 200° C. as the end of the polymerization heat treatment. The pasty solid formed after room temperature soaking was subjected to additional heat treatments at intermediate temperatures—up to 200° C., all under air, for 24 hours. The hard polymer solid that forms at this stage is then carbonized. From FIG. 2, we see that the d(W)/dt curve flattens out after 800° C., which is then picked as a suitable temperature for carbonization.

To encourage the formation of HC from the precursors described in this embodiment, regions of micro-crystalline graphitic order need to form in the solid. According to the prevalent theories, this can be achieved by using the carbonization heat treatment to create the appropriate porosity (from the departing volatile organic compounds), followed by high temperature heat treatment that aligns the material to form larger micro-crystalline regions. The initial polymerization reaction is also important in this scheme, as it provides the basic structure for the carbonization and final heat treatment process. To that end, the initial polymerization reaction which forms the solid, needs to have in a higher level of graphitic order than a typical soft activated carbon, so as to facilitate the structural adjustments during the subsequent heat treatment steps.

To ensure that a HC is formed, the carbonization heat treatment is performed at a slow heating rate, and must be held at the final carbonizing temperature of 800° C. for several hours. We have followed this up with a final higher temperature calcination treatment at 1000° C. Heating rates are generally less than 5° C./min, ideally 2° C./min and lower through the 350° C. to 400° C. range to ensure that the reaction shown in the TGA data of FIG. 2 is complete. Faster rates to 800° C. can be used, but must be accompanied by an initial soak between 350° C. to 400° C. Carbonization is performed under an inert atmosphere. The final calcination step at 1000° C. is also performed under an inert atmosphere.

For the embodiment described above, room temperature polymerization was followed by heating at several intermediate temperatures between 60° C. and 120° C., followed by a treatment at 200° C., all under air, to form the hard polymer solid. Carbonization was carried out at 800° C. for 4 hours, under nitrogen. No high temperature calcination was used. XRD measurements of the embodiment were made on a Malvern Panalytical Empyrean X-ray instrument, with Cu $K_\alpha$ radiation, operating at 35 kV, 30 mA. The XRD pattern shows a strong $d_{002}$ peak at 23.65°, corresponding to a d-spacing of 3.76 Å. BET measurements were made on a Quantachrome NovaTouch LX2 instrument using $N_2$ as the adsorbent gas. BET multi-point surface area and pore volumes (using the NLDFT model for slit pores in the carbon— as derived by Quantachrome Instrument's TouchWin™ version 1.21 software) were obtained to be 89.8 $m^2$/gm and 0.0644 cc/gm, respectively (shown in Table 2).

In a variation of the above embodiment, 150 ml of furfuryl alcohol was mixed with 14.7 gm of a combination of organic acids (oxalic acid+maleic acid+tartaric acid, in 1:1:1 molar ratios) and the mixture was allowed to soak at room temperature until a pasty solid formed (coinciding with the rate of weight loss approaching zero). At this point the material was heated at 120° C. and 200° C., under air to complete the polymerization process. Carbonization was performed by first heating at 360° C. followed by 4 hours at 800° C. and 30 mins at 1000° C. The density of this material was measured to be 1.41 gm/cc, BET surface area was 3.89 $m^2$/gm, and the pore volume was 0.0047 cc/gm (NLDFT model with slit pores). By changing the polymerization and carbonization conditions, the characteristics of the final HC can be changed to dramatically reduce the SSA from ~90 $m^2$/gm to 3.9 $m^2$/gm, while maintaining similar XRD characteristics. These data are shown in Table 2.

TABLE 2

| Precursors | Polymerization | Carbonization | BET SSA ($m^2$/gm) | Pore volume (cc/gm) | XRD 2θ (°) | XRD $d_{002}$ (Å) |
|---|---|---|---|---|---|---|
| Furfuryl alcohol + organic acids | Room temp. + intermediate temp + 120° C. + 200° C. | 4 hours/ 800° C. | 89.9 | 0.0644 | 23.65 | 3.76 |
| Furfuryl alcohol + organic acids | Room temp. + 120° C. + 200° C. | 4 hr./ 360° C. 4 hr./ 800° C. 0.5 hr./ 1000° C. | 3.89 | 0.0047 | 23.9 | 3.71 |

The two embodiments discussed produce HCs from a furfuryl alcohol/organic acid catalyst mixture. This differs from our earlier disclosure (U.S. Pat. No. 9,458,021) to make high surface area activated carbons from furfuryl alcohol/organic acid mixtures in the following ways: (i) the activated carbon version needs the addition of a conductive carbon powder like carbon black to the starting mixture— which the HC process does not; and (ii) the heat treatments used to carbonize are different. Specifically, the HCs need much slower carbonization steps, with higher temperatures (800-1000° C.) than the activated carbons.

Besides furfuryl alcohol, other furan-ring containing chemicals like poly furfuryl alcohol (PFA) resins can also be used as precursor materials. Specifically, we have used commercially available FUROLITE, from TransFuran Chemicals in Geel, Belgium. We have evaluated the polymerization of this PFA using the following acid catalysts: oxalic acid, tartaric acid, maleic acid, citric acid, formic acid and a 1.5M nitric acid solution. PFA is a slower polymerizing material than furfuryl alcohol, can be polymerized with stronger acidic catalysts like nitric acid. We have also evaluated the organic acids dissolved in water, instead of in their dry powder form. This was done to better mix the catalyst with the PFA, since the PFA is a viscous liquid (the version we used had a viscosity ~2100 cP). Any excess water (e.g. in the case of oxalic acid that has a low solubility in water) was naturally removed during the subsequent heating steps. In all cases, we have successfully polymerized the PFA by using between 5 and 12% (by wt.) of the catalyst, and soaking at room temperature for 24 hours before heating at temperatures between 60° C. and 200° C., under air.

In one embodiment, the PFA (FUROLITE, from Trans-Furan Chemicals) was polymerized using 10 wt. % of formic acid by heating the mixture up to 200° C. The polymerized PFA was then carbonized under two different conditions: (a) 2 hours at 800° C. (under an inert atmosphere); and (b) 4 hours at 800° C., (under an inert atmosphere); followed by 30 mins at 1000° C. (also under an inert atmosphere). BET measurements were done to evaluate the surface area and pore sizes as a function of the difference in processing conditions. BET multi-point surface area, pore volume and pore sizes obtained (Quantachrome Instruments) for the two carbons described above are shown in Table 2. Additionally, the bulk density of the carbonized materials was measured and the results are also included in Table 3.

TABLE 3

|  | BET surface area (m²/gm) | Pore volume (cc/gm) (NLDFT) | Pore width (nm) (NLDFT) | Bulk Density (gm/cc) |
|---|---|---|---|---|
| (a) PFA polymer with faster carbonization | 34.33 | 0.0352 | 1.18 | 1.12 |
| (b) PFA polymer with slower carbonization | 11.13 | 0.0065 | 1.18 | 1.43 |

As can be seen from the table above, the carbonization process has a significant effect on the development of surface area and pore volume, although the size of the pores (as measured by nitrogen adsorbents) remains the same. Also, the density of the carbon with the slower carbonization process was measured to be significantly larger than the other. Consequently, changing processing conditions like the carbonization treatment can be used to determine the density, surface area and pore volume of the final hard carbon produced by the method described in this disclosure. This has implications with respect to end-use applications—specifically for fast-charging LIB devices versus high-capacity devices. As we have indicated earlier, fast charging devices would benefit from a larger surface area anode carbon material, since this facilitates the Li ion intercalation process at the expense of a larger 1st cycle irreversible capacity loss due to a larger SEI formation. Smaller surface area carbons, on the other hand, have a much lower 1st cycle loss (irreversible) due to a smaller SEI. In either case, the method described here can be tuned to produce hard carbons with a range of surface areas.

The methods described by Nishi et al. (U.S. Pat. No. 4,959,281), Imoto et al. (U.S. Pat. Nos. 5,643,426, 56,716, 732) and Azuma et al. (U.S. Pat. No. 5,093,216), also utilize furfuryl alcohol but there are significant differences between the instant disclosure and the methods described in the aforementioned patents. Specifically:

- The most important distinction is that our method described here first polymerizes the furfuryl alcohol into a party solid at room temperature. This is critical, since it affects the nature of the materials formed by all the subsequent heating steps. The processes described in the other patents do not soak at room temperature. The other methods use some form of heating of liquid furfuryl alcohol—which undergoes an exothermic reaction during polymerization and can be dangerous in large scale industrial settings. With a benign room temperature process, no risk of thermal runaway exists.
- Our method does not require a vacuum distillation step (as described in U.S. Pat. No. 4,959,281). Our method uses only weak solid acids (organic acids), unlike the methods described in U.S. Pat. No. 5,093,216, which uses $H_3PO_4$ (a toxic and hazardous substance). Our method does not need to reflux-heat the initial furfuryl-alcohol precursor (U.S. Pat. No. 5,093,216 describes reflux heating of the furfuryl-resin water mixture to maintain the pH). Our method involves a long room temperature soak, until a solid is obtained (keeping the manufacturing processes simple).
- Our method does not require the addition of phosphorous to achieve a $d_{002}$ spacing greater than that of graphite (U.S. Pat. Nos. 5,093,216 and 4,959,281 require the presence of phosphorous). The instant method does not use heating under a constant low pressure (~20 KPa), as described in U.S. Pat. No. 5,716,732.

In another embodiment, the furan-ring containing compound is an acetylfuran. The catalysts used for this precursor include tetrachlorosilane, dichlorosilane, trichlorosilane or dichlorodimethylsilane. In one particular embodiment, 100 ml of acetylfuran (Sigma Aldrich) was mixed with 25 ml of dichlorodimethylsilane (Sigma Aldrich). The mixture was then soaked at room temperature until a pasty solid was obtained. This was heated at 40° C., 87° C., 127° C. and 200° C. under air to complete the polymerization. Carbonization was performed by first soaking the polymerized solid at 360° C. for 4 hours under nitrogen, followed by 4 hours at 800° C. This embodiment is further described in detail in Example 5, below.

We have earlier disclosed methods to make high surface area activated carbons by polymerizing acetylfuran using dichlorodimethylsilane as a catalyst (U.S. Pat. No. 9,458,021). In that case, the polymerized solid was carbonized for 1 hr. at 600° C., with a heating rate close to 10° C./min. In the instant case, we carbonize by first soaking at 360° C. for 4 hours before holding at 800° C. for an additional 4 hours. This is followed by a high temperature calcination treatment and results in the formation of HC with clear $d_{002}$ peaks in the XRD pattern and low surface area of ~100 m²/gm. PIXE (proton induced x-ray emission) measurements of the Si content of these HCs resulted in 0.24 wt. %. This Si was allowed to remain in the HC as there is not expected to be any deleterious effect in the performance of a LIB anode with embedded Si in the carbon (unlike the Si in the C/Si composites described earlier, the Si in this material is not capable of intercalating Li as it exists as a siloxane in the carbon—U.S. Pat. No. 9,458,021). HARD CARBONS WITH SILICON:

HC composites with Si can also be derived from the methods described here. Specifically, in one embodiment, a mixture of oxalic acid (2.5 gm) and maleic acid (5 gm) was added to 100 gm of PFA, along with 8.7 gm of metallic Si powder (<325 mesh, Sigma Aldrich, St. Louis, Mo.). In a variation of this embodiment, the same ratio of organic acids was first dissolved in de-ionized (DI) water before being added to the PFA. In both cases a pasty solid was formed after soaking at room temperature for 24 hours. Further processing was then performed by heating the solid at temperatures between 60° C. and 200° C. to complete the polymerization reaction. The polymerized solid was then carbonized and calcinated as described in the previous embodiments. The final silicon content was measured by PIXE methods to be 12 wt. %. A similar HC/Si composite can be synthesized using furfuryl alcohol instead of PFA. The method described above differs substantially from other methods to make HC/Si composites in that it is simpler (does not involve CVD of Si or C) and involves mixing a solid Si powder with a liquid furan-ring compound (rather than mixing Si and C solids—which will not result in the same level of homogeneous mixing as can be obtained when one of the components is a liquid).

Another material we have used as a source for Si is an aluminosilicate clay mineral, Halloysite. It is a naturally occurring clay mineral with the chemical formula $Al_2Si_2O_5(OH)_4 \cdot nH_2O$. It has a nano-tube structure, with a wall thickness of ~10 aluminosilicate sheets and is ~10 to 50 nm in diameter. TGA studies of Halloysite show the main weight loss appearing between 450° C. and 700° C., with the peak at 471° C. related to the removal of the structural water. Beyond 700° C., weight loss is negligible up to 1050° C., although a small endothermic peak is seen at 1002° C., associated with the nucleation of mullite [Boordeepong, S., et al., 2011]. The total weight lost when Halloysite is heated up to 1000° C. is ~15 wt. %. It also has interesting electrochemical properties as has been recently evaluated as an electrolyte-filler in solid-state Li-sulfur battery applications (Lin, Y., et al., 2017). Also, it has been used to make porous carbon micro-particles from furfuryl alcohol—for use as LIB anode materials (Subramaniyam, C. M. et al. 2017). Here, the Halloysite is first etched to remove the alumina, and after several washing steps, the resulting porous tubular silica is mixed with furfuryl alcohol and polymerized. After carbonization, the remaining porous tubular silica is etched away to create porous carbon micro-particles with a BET surface area of 329 $m^2$/gm. The basic idea here was to use the Halloysite as a template to create a carbon structure that mimics the nano-tubular structure of the Halloysite. We consider a very different approach in our method, by incorporating the Halloysite directly into the HC, without etching it away. Also in our case, the furan-ring precursor compounds are polymerized using organic acid catalysts at room temperature to ensure the formation of a bulk hard carbon with low specific surface area values (<100 $m^2$/gm), rather than a porous carbon micro-particle structure obtained by Subramaniyam, C. M. et al.

In one embodiment of the invention, 246 gm of PFA (Furolite™ from TransFuran Chemicals, Geel, Belgium) was mixed with 21 gm of a mixture of oxalic acid, maleic acid and tartaric acid, in 1:1:1 molar ratios) and 11 gm of as-received Halloysite powder (Dragonite™ from Applied Minerals, Inc., NY). The mixture was soaked at room temperature until a pasty solid was obtained. This solid was heated at intermediate temperatures of 60° C. to 200° C., under air, to complete the polymerization reaction. Next, carbonization was performed by heating under nitrogen at 800° C. for 4 hours. The heating rate from 360° C. to 800° C. was less 3° C./min. BET measurements resulted in a multi-point specific surface area value of 40.1 $m^2$/gm. The corresponding pore volume was 0.0216 cc/gm (NLDFT model, using slit pores in carbon). The density of this HC was measured to be 1.51 gm/cc.

Other combinations of catalysts have also been used with PFA and Halloysite. Specifically, we have polymerized 139 gm of PFA with 7 gm of Halloysite using 15 gm of tartaric acid in a solution of DI water. Also, we have polymerized 142 gm of PFA with 7 gm of Halloysite using 5 gm of dry oxalic acid powder. Other combinations including citric acid in DI water solution, formic acid and maleic acid have also been used successfully to polymerize the PFA.

Halloysite was also been successfully added to furfuryl alcohol, which as then polymerized using the organic acid combination. In one embodiment, 105 gm of furfuryl alcohol was mixed with 4.3 gm of Halloysite and polymerized using a combination of oxalic acid, maleic acid and tartaric acid. The polymerized solid was carbonized and characterized using XRD, Raman and BET measurements (see example #6, below).

Finally, HC made with the method described in this disclosure has also been embedded with $Li_4Ti_5O_{12}$ powder (LTO). LTO is a promising anode material for LIBs targeting the electric vehicle market due to its high potential ~1.55 V (vs. Li/Li+), and its excellent cycle life due to its negligible volume change during charge/discharge cycles. In one embodiment, we have added 23 gm of LTO (MSE Supplies, Tucson Ariz.) to 143 gm of PFA and polymerized this with 3.5 gm of oxalic acid and 7 gm of maleic acid. The LTO had a d50 particle size of 0.8-1.6 micrometers. Polymerization was done by soaking at room temperature, followed by heating at intermediate temperatures between 60° C. and 200° C. The polymerized solid was then carbonized by heating at 800° C. for 4 hours under nitrogen. In another embodiment, 105 gm of furfuryl alcohol was mixed with 17 gm of LTO and polymerized using 4 gm of oxalic acid and 6 gm of maleic acid. In yet another embodiment, we used citric acid in a DI water solution as the catalyst. In another embodiment, oxalic acid in a DI water solution was used as the catalyst to polymerize a mixture of PFA and LTO.

Example 1

In this embodiment, 150 ml of furfuryl alcohol (#W249106, from Sigma Aldrich, St. Louis, Mo.) was mixed with 15 gms of organic acids—comprising a mixture of oxalic acid (#75688, from Sigma Aldrich St. Louis, Mo.), maleic acid (#M0375, from Sigma Aldrich St. Louis, Mo.), and L-(+)-tartaric acid (#T109, from Sigma Aldrich St. Louis, Mo.), in weight ratios of 1:1.29:1.66, respectively. The mixture was stirred using an overhead stirrer operating at 100 rpm, for 1.5 hours and then set aside at room temperature (22° C.). During room temperature aging, measurements of the weight of the mixture were periodically made to track the weight loss behavior. As the rate of weight loss approached zero, the mixture formed a pasty solid. At that point, the material was placed in a 120° C. oven, under air. Weight loss was again monitored, and once the rate approached zero, the oven temperature was raised to 200° C. Once again, after the rate of weight loss approached zero, a hard polymerized solid was formed. This material was then carbonized at 800° C., by holding it at temperature for 2 hours under nitrogen. This was performed in a standard quartz tube (50 mm diameter) furnace, using a heating rate of 5° C./min. Finally, a high temperature heat treatment was performed at 1000° C. for 30 minutes to produce the hard carbon.

Figure 3:
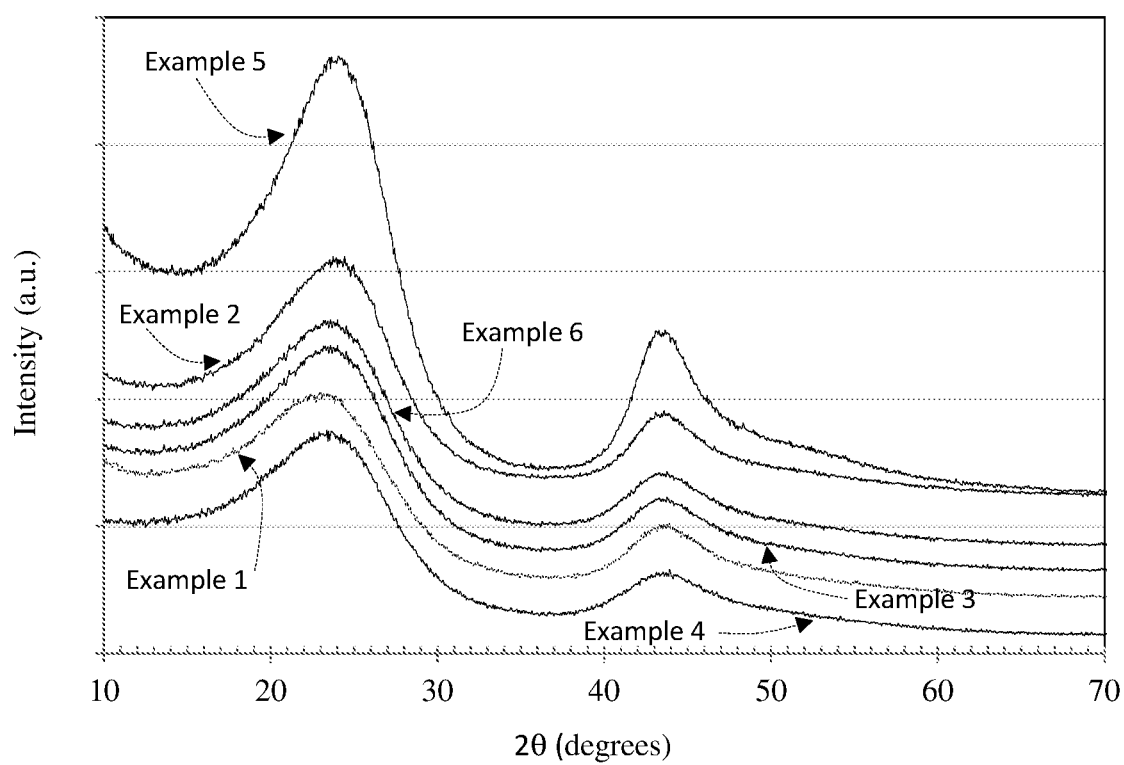
FIG. 3: XRD plots of hard carbons from Examples 1 through 7.

The hard carbon produced with this method was then characterized using X-ray diffraction (XRD) and Raman spectroscopy. XRD plots were obtained using Cu $K_\alpha$ radiation (operating at 35 kV and 30 mA), in a continuous scan mode. FIG. 3 shows the XRD plot of intensity versus 2theta (from 10° to 70°) for this material (labeled as 'Example 1'). A $d_{002}$ peak is seen at 22.79°, corresponding to 3.90 Å spacing. However, the asymmetrical shape of the $d_{002}$ peak suggests more micro-crystalline regions with $d_{002}$ spacings greater than this value too (>4 Å —left leg of Example 1's $d_{002}$ peak). A smaller peak is also seen at 43.79°. Furthermore, from the measurement of the $d_{002}$ peak—full width at half maximum (FWHM)—the size of the individual crystalline domains can be estimated using the Scherrer equation (=K·λ/β·cos θ), where K is a dimensionless shape factor (typically ~0.9); λ is the X-ray wavelength; β is the (FWHM) minus the instrumental line broadening, and θ is the Bragg angle. FWHM for the $d_{002}$ peak is 7.960°, which results in a micro-crystalline dimension of 1.06 nm. This XRD pattern is—with the $d_{002}$ peak around 23° (20 values) distinguishes this carbon from both amorphous high SSA activated carbons and graphite.

Figure 4:
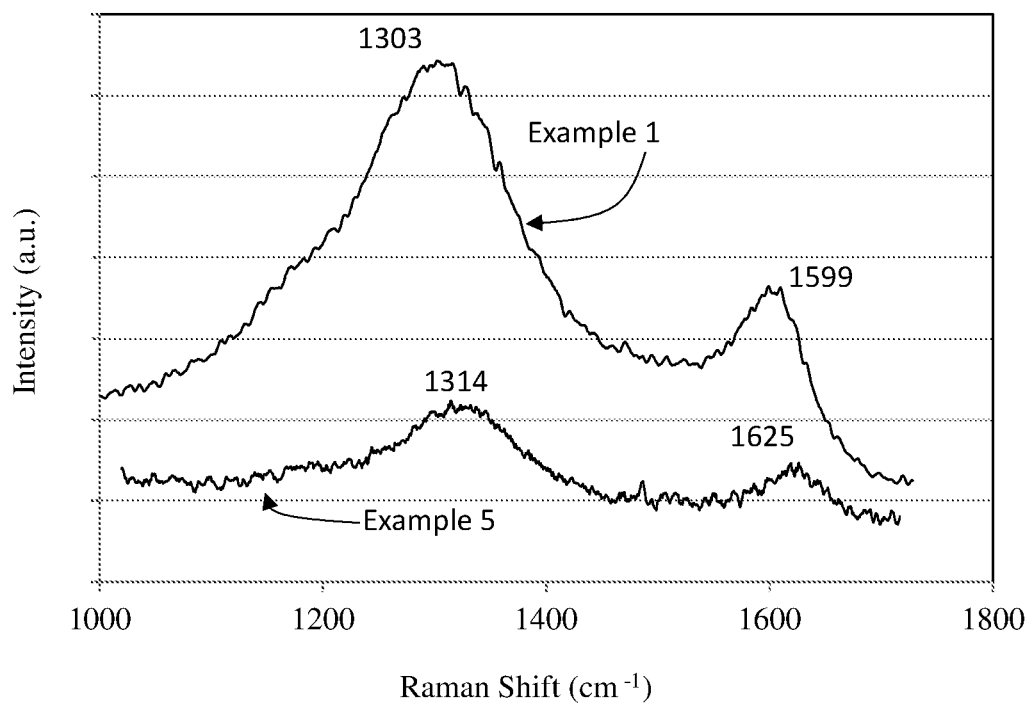
FIG. 4 (*a*): Raman spectrographs of hard carbons from Examples 1 and 5; 4(b) from Examples 2-4, 6 and 7.

Raman spectroscopy measurements are shown in FIG. 4(a) and were recorded with an inVia Raman Microscope (Renishaw PLC, Gloucestershire, UK) using an excitation wavelength of 785 nm at 100 mW laser power. The ratio of the intensities for the D-band and G-band peaks is best described by using a ratio of the deconvoluted areas under the respective peaks. This was measured to be 1.78, compared to a ratio of 0.113 obtained for graphite (Tianchan, J., et al., 2017).

Figure 5:
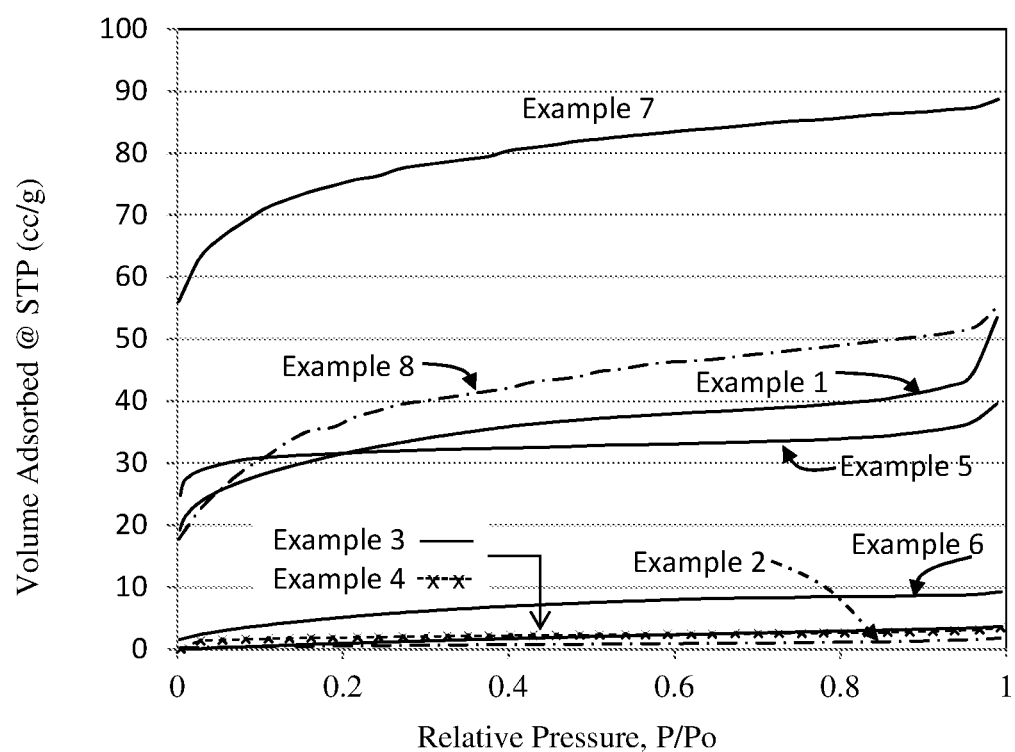
FIG. 5: $N_2$ isotherms (from BET measurement) for hard carbons from Examples 1 through 8.

BET surface area measurements were also made on this carbon using $N_2$ adsorption at 77K. A QUADRASORB Evo™ Gas Sorption Surface Area and Pore Size Analyzer was used for textural characterization. Before adsorption measurements were made, samples were outgassed at 250° C. for at least 20 hours. The $N_2$ isotherm (adsorption) is shown in FIG. 5. Multi-point BET surface area was measured to be 110 $m^2$/gm and pore volume was calculated to be 0.083 cc/gm (using NLDFT theory, assuming slit pores in the carbon). Finally, the tap-density (powder form) of this material was measured to be 1.25 gm/cc.

In this example we have synthesized a non-amorphous hard carbon with a $d_{002}$ spacing of >3.6 Å (in the XRD plot)—from furfuryl alcohol by polymerizing it with organic acids and using carbonizing heat treatments. Additionally, Raman spectra obtained from this carbon are characteristic of non-graphitic carbons. The HC made with this method is suitable for constructing anodes for Li-ion and Na-ion batteries and capacitors.

TABLE 4

| | | XRD data | | | Raman data | | | BET data | |
|---|---|---|---|---|---|---|---|---|---|
| Example | Description | (002) 2θ (°) | $d_{002}$ (Å) | FWHM (°) | D ($cm^{-1}$) | G ($cm^{-1}$) | $I_D/I_G$ | SSA ($m^2$/gm) | Pore Volume (cc/gm) |
| #1 | Furfuryl alcohol + organic acid | 22.79 | 3.90 | 7.960 | 1303* | 1599* | 1.62 | 110 | 0.083 |
| #2 | Furfuryl alcohol + organic acid | 23.97 | 3.71 | 7.488 | 1352 | 1604 | 1.75 | 2.02 | 0.0022 |
| #3 | Furfuryl alcohol + Furfural + organic acid | 23.58 | 3.77 | 7.92 | 1347 | 1595 | 2.15 | 6.76 | 0.0043 |
| #4 | Poly furfuryl alcohol + formic acid | 23.45 | 3.79 | 8.010 | 1337 | 1603 | 1.85 | 6.71 | 0.0071 |
| #5 | Acetylfuran + dichlorodimethyl silane | 23.94 | 3.71 | 6.941 | 1314* | 1625* | 1.54 | 105 | 0.053 |
| #6 | Furfuryl alcohol + organic acids + Halloysite | 23.70 | 3.75 | 7.799 | 1351 | 1598 | 1.98 | 20.7 | 0.019 |
| #7 | PFA + Si powder | 23.45 | 3.79 | 6.323 | 1341 | 1603 | 1.5 | 977 | 0.127 |
| #8 | Furfuryl alcohol + organic acids + LTO | — | — | — | — | — | — | 131 | 0.080 |

*Measured with 785 nm laser (all others with 532 nm laser).

Figure 6:
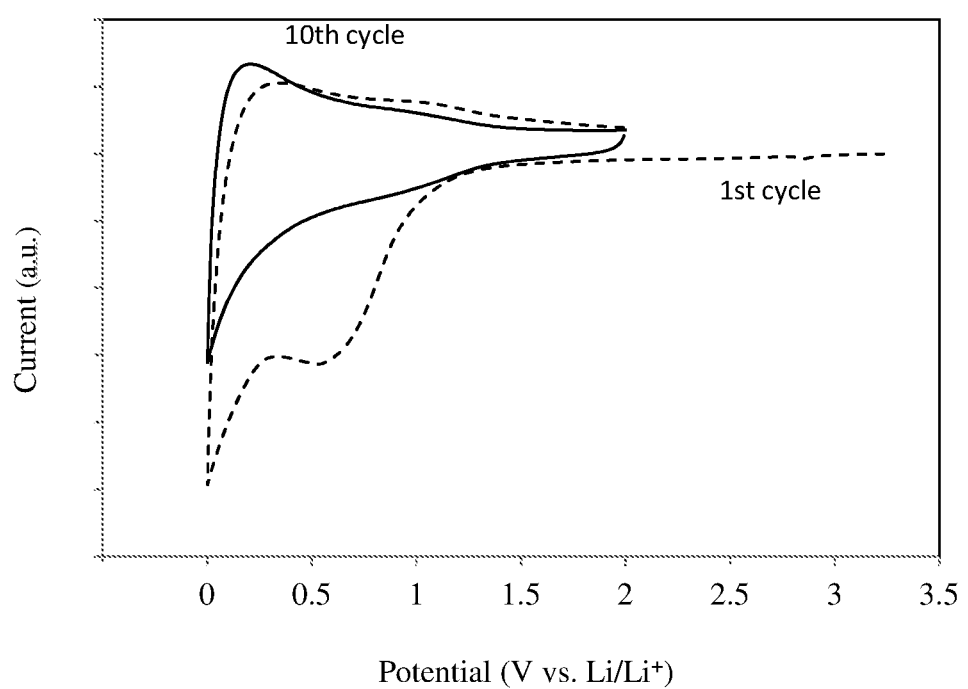
FIG. 6: (a) Cyclic voltammogram of hard carbon from Example 1, 1st and 10th cycle; (b) Capacity versus #cycle for hard carbon from Example 1, at different C-rates, up to 100 C.
Figure 6B:
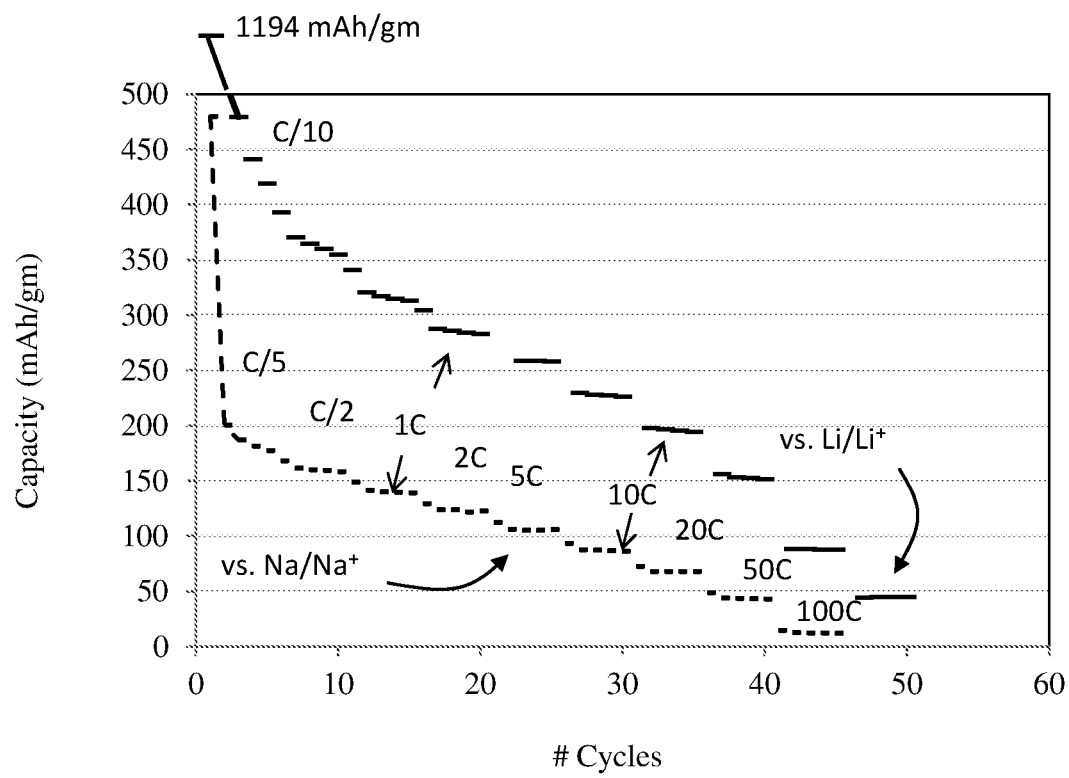
Figure 7A:
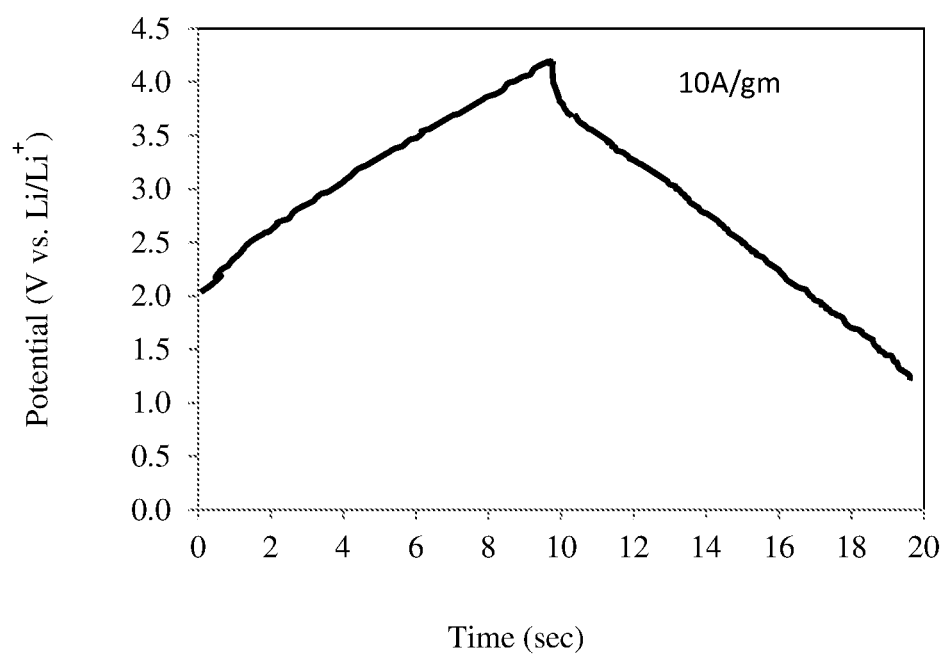
FIG. 7: (a) Typical charge/discharge cycle at 10 Amp/gm for a Li-ion capacitor configuration using the hard carbon of Example 1; 7 (b) Cycle life for the same configuration over 1000 cycles.
Figure 7B:
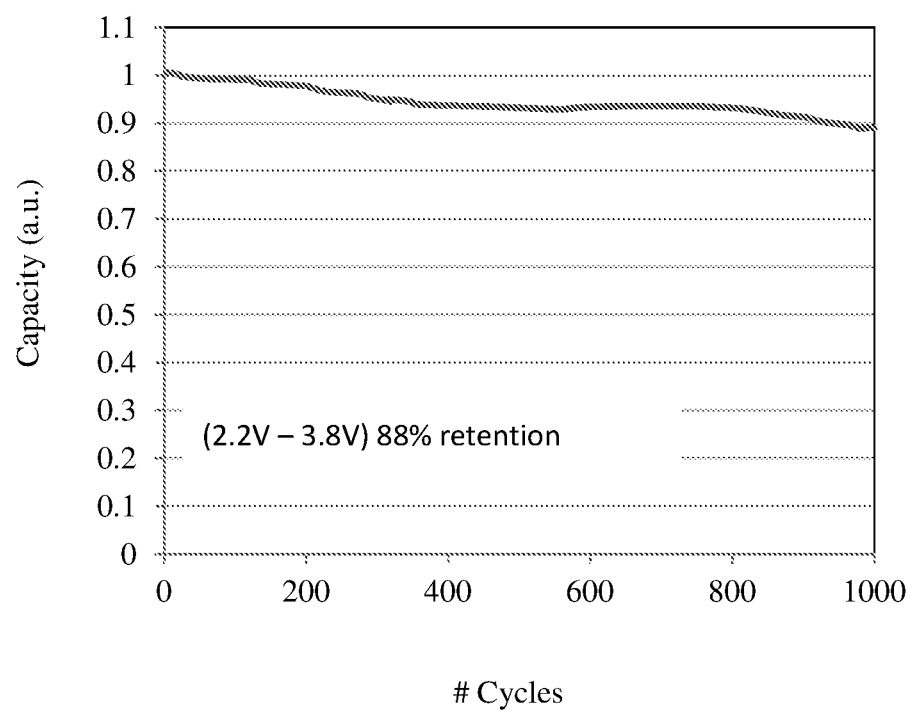

This HC was also tested for electrochemical performance First, it was ball milled to reduce the size to an average of 20 microns for electrode making. Next, a 3-electrode set up was used with a Li/Li+ reference electrode and a Li counter electrode, along with a 1M $LiFP_6$ EC:DMC electrolyte. Cyclic voltammetry results are shown in FIG. 6 (a), for the $1^{st}$ and $10^{th}$ cycle, along with capacity versus charge/discharge cycles at different charging rates ('C' rates) FIG. 6(b). The 1st cycle in FIG. 6 (a) shows a reaction around 0.6 V believed to be associated with the formation of the SEI layer. From FIG. 6 (b), a large 1st cycle irreversible loss can be seen (from a $1^{st}$ cycle capacity of 1194 mAh/gm). This is attributable to the relatively large surface area measured with this HC (110 $m^2$/gm). However, it is also seen from FIG. 6(b), that the capacity values hold up well as the charging rate is increased—even up to 100 C, implying good fast-charging behavior on the part of this HC. Finally, Li-ion capacitor performance was also evaluated from this 3-electrode set up (along with a counter electrode of commercial activated carbon). The HC electrode characteristics are 1-1.5 mg/$cm^2$ (mass loading), 40-60 micron thickness and a 1:1 mass ratio for the HC and activated carbon electrode. A typical charge/discharge curve for a charging current of 10 Ampere/gm is shown in FIG. 7 (a), along with long term cycling behavior (2.2V to 3.8V) over 1000 cycles in FIG. 7 (b). This HC was also tested against Na/Na+ reference electrodes for Na-ion battery and capacitor applications. Once again, the large $1^{st}$ cycle loss (from 480 mAh/gm) is attributed to the SSA of this HC. These data are also shown in FIG. 6 (b).

Example 2

In another embodiment, 150 ml of furfuryl alcohol was mixed with 15 gm of oxalic, maleic and tartaric acid (in 1:1:1 molar ratios). The mixture was allowed to soak at room temperature to begin the polymerization process—similar to Example 1. When the rate of weight loss approached zero, the mixture had formed a pasty solid. It was then heated in an oven at 60° C., under air, for 24 hours. This was followed by heating at 120° C. under air for 24 hours, and for an additional 24 hours at 200° C., to form a hard polymerized solid. This material was then carbonized at 800° C. under nitrogen for 4 hours. A heating rate of ~1.5° C./min was used. Finally, a calcination treatment at 1000° C. was performed for 30 mins.

Figure 4B:
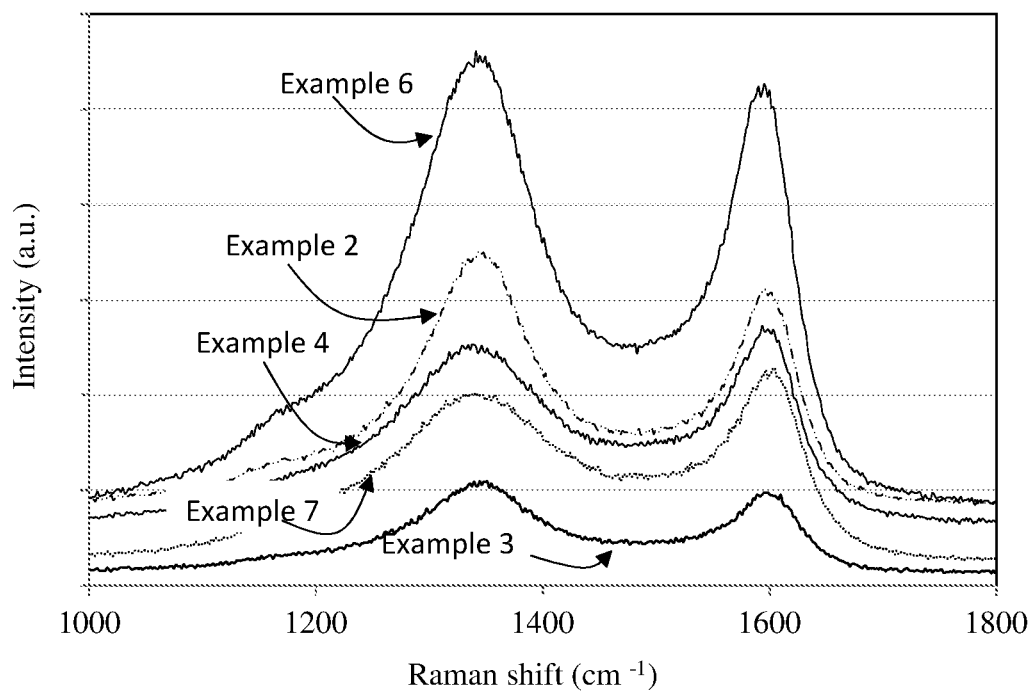

The XRD plot of this HC is shown in FIG. 3. A $d_{002}$ peak is seen at 23.97°, corresponding to 3.71 Å spacing. As with Example 1, the asymmetrical shape of the $d_{002}$ peak suggests more micro-crystalline regions with $d_{002}$ spacings greater than this value too. The FWHM for this peak is measured to be 7.488°. Raman spectroscopic measurements of this material were obtained with a Renishaw inVia Raman microscope (with a 532 nm laser source). Plots are shown in FIG. 4(b). Once again a pronounced D-band peak can be seen—indicating the presence of a non-graphitic hard carbon structure. The ratio of the intensities for the D-band and G-band peaks was calculated based on the area of the two deconvoluted peaks to be 1.75.

$N_2$ adsorption isotherms were measured on a Quantachrome NovaTouch LX2 instrument, and are shown in FIG. 5

(adsorption only). Specific surface area and pore volumes (NLDFT, slit pores) were also obtained (data shown in Table 4). The surface area measured for this HC was 2.018 m$^2$/gm, along with a pore volume of 0.0022 cc/gm.

The main difference between this HC and that from Example 1 is the dramatic difference in surface area (~110 m$^2$/gm versus ~2 m$^2$/gm). This is attributed to the change in processing conditions, specifically the additional heating step at 60° C. during polymerization, the longer carbonizing and slower heating rate—in the case of Example 2. Changes in the XRD characteristics are also observed with the additional heat treatments of Example 2 resulting in a smaller d$_{002}$ spacing, and a sharper peak (smaller FWHM).

Given the low SSA values for Example 2, LIB anodes made for this HC would then be expected to result in a much smaller 1st cycle irreversible capacity loss, due to a smaller SEI layer formation associated with the much smaller surface area of this HC. Clearly, control of the heat treatment parameters—after initial room temperature polymerization—will control the final properties of these HCs—in particular the specific surface area obtained from these different heat treatments.

Example 3

In a further embodiment, 115 gm of furfuryl alcohol was mixed with a total of 11.5 gm of oxalic, maleic and tartaric acid (in 1:1:1 molar ratios). Next, 11 gm of furfural (#185914, from Sigma Aldrich, St. Louis, Mo.) was stirred into the mixture. This was allowed to polymerize by soaking at room temperature till it formed a pasty solid. This was then heated at intermediate temperatures between 60° C., and 200° C., all under air, to form a hard polymerized solid. Next, the polymerized solid was carbonized by heating it up to 800° C. for 4 hours under an inert atmosphere (nitrogen was used).

The carbon formed from this process was also evaluated using the same tools as before (XRD, Raman and BET). The XRD plot is shown in FIG. 3, with the d$_{002}$ peak at 23.58°, corresponding to a spacing of 3.77 Å, indicating the presence of a hard carbon. The FWHM of this peak was measured to be 7.92°. Raman spectra (FIG. 4(a)) also show a large d-band peak, indicating the presence of non-graphitized hard carbon. The ratio of the intensities of the D and G peaks (deconvoluted areas under the peak) was calculated to be 2.15. The N$_2$ isotherm (adsorption) from the BET testing is shown in FIG. 5. The SSA calculated for this HC was 6.76 m$^2$/gm, along with a pore volume of 0.0042 cc/gm (NLDFT, slit pores). This example shows a combination of two furan-ring containing compounds—furfuryl alcohol and furfural—that was synthesized with an XRD d$_{002}$ peak of >3.6 Å and a large D-band peak—indicating the presence of a non-amorphous, non-graphitic hard carbon. This HC example also had a very low specific surface area—suitable for high energy Li-ion and Na-ion batteries and capacitors.

Example 4

In yet another embodiment, 100 gm of a poly furfuryl alcohol, (FUROLITE™ from TransFuran Chemicals, Geel, Belgium) was mixed with 10 gm of formic acid. The mixture was then soaked at room temperature for 24 hours before being heated at temperatures between 60° C. and 200° C., under air, to form a solid polymer material. The solid polymer was then carbonized by first heating at 360° C., followed by a 2 hour treatment at 800° C. under an inert atmosphere (nitrogen was used). XRD and Raman data are shown in FIGS. 3 and 4(b), respectively; and the specific values are shown in Table 4. XRD measurements show the d$_{002}$ peak at 23.45°, corresponding to a spacing of 3.79 Å. The FWHM is measured to be 8.01°. These data are very similar to the XRD data obtained from Example 3. Raman spectra (with a 532 nm laser) also show a large prominent D-band peak centered at 1337 cm$^{-1}$. The ratio of the integrated area under the curves is measured to be 1.85. N$_2$ isotherms from the BET data are shown in FIG. 5. The specific surface area for this HC was measured to be 6.71 m$^2$/gm, along with a pore volume of 0.0071 cc/gm (NLDFT, slit pores).

Here we show that PFA can also be used as the precursor material to make a carbon with an XRD d$_{002}$ spacing of >3.6 Å and a large Raman D-band peak—indicating the presence of a non-amorphous, non-graphitic hard carbon using the method described in this disclosure. The corresponding BET data also show a very low surface area value of 6.7 m$^2$/gm, suitable for high energy Li-ion and Na-ion batteries and capacitors.

Example 5

In yet another embodiment, 100 ml of 2-Acetylfuran—C$_6$H$_6$O$_2$— (#W316318 from Sigma Aldrich, St. Louis, Mo.) was mixed with 25 ml of dichlorodimethylsilane—C$_2$H$_6$Cl$_2$Si— (#440272 from Sigma Aldrich, St. Louis, Mo.) at room temperature and stirred for 60 minutes. The mixture was then allowed to soak at room temperature under air. Once the rate of weight loss approached zero, the material was heated at 40° C. under air for 24 hours, at 87° C. for 23 hours, at 120° C. for 24 hours, and at 200° C. for 24 hours. Next it was baked at 360° C., under air for 4 hours. Very slow heating rates were used (1.25° C./min, in this case), followed by carbonization at 800° C. for 4 hours, under nitrogen. The carbonized material was then subjected to a high temperature treatment at 950° C., under CO$_2$ for 100 mins followed by a calcination step at 1025° C. for 60 minutes under nitrogen. XRD, Raman and N$_2$ isotherm (BET) data are shown in FIGS. 3, 4(a) and 5, respectively. The data are presented in Table 4. This HC was also evaluated for chemical composition using the PIXE (proton-induced x-ray emission) method. No chlorine was found in the HC, although a 0.24 at. % concentration of Si was measured. Raman spectra were gathered with a 785 nm laser (similar to Example 1). Once again, the presence of a d$_{002}$ peak in the XRD data, and the presence of a large D-band peak are characteristic of a non-amorphous, non-graphitic hard carbon.

Figure 8:
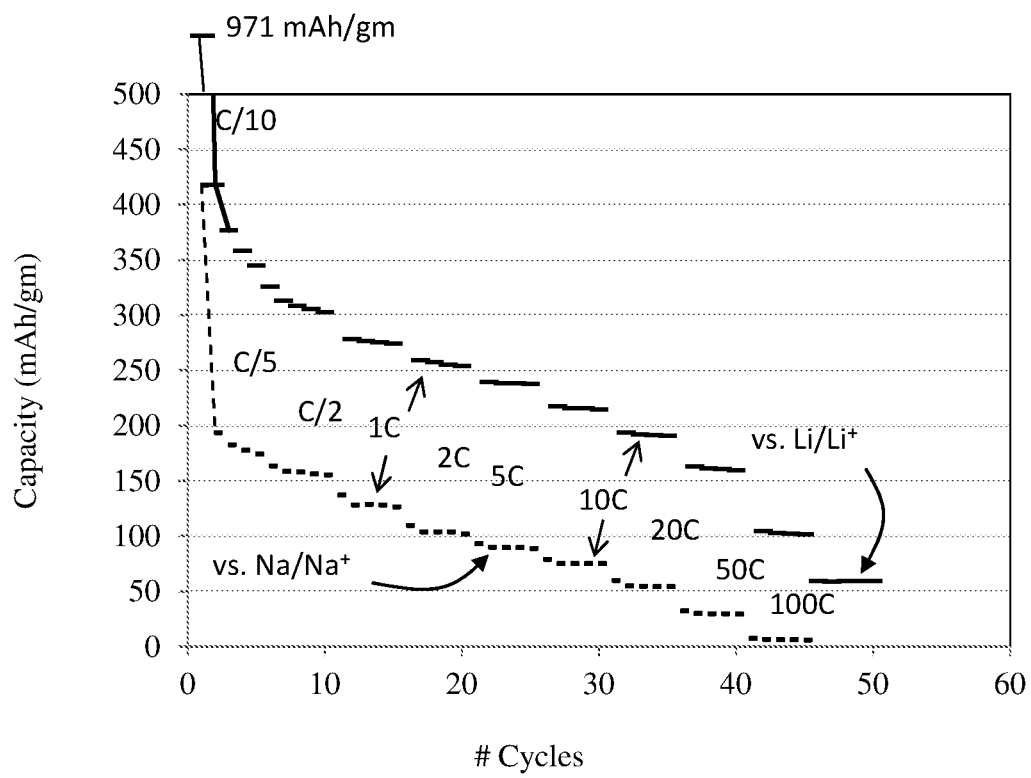
FIG. 8: Capacity versus number of cycles for hard carbon from Example 5 at different C-rates, up to 100 C.

This HC was also used in a 3-electrode set up to evaluate electrochemical performance against Li/Li+ and Na/Na+ reference electrodes (similar to the data presented in Example 1). The methods described in Example 1 were used. The capacity versus charge/discharge cycles plot—for different 'C' rates (up to 100 C)—is shown in FIG. 8. These are very similar to the values obtained with Example 1, and show good performance under high charging rates—up to 100 C, although a large 1$^{st}$ cycle loss is also seen (from 971 mAh/gm for Li/Li$^+$, and from 420 mAh/gm for Na/Na$^+$). This irreversible loss can be attributed to the SSA of this HC. As seen from Table 4, the specific surface area values between Example 1 and 5 are similar, but there is some difference in the XRD and Raman data. In this example, we have fabricated a non-amorphous hard carbon from acetyl-furan, by polymerizing it with a strong acidic catalyst from the silane group (specifically dimethyldichlorosilane). By controlling the carbonization treatments (temperature, time, heating rate), the properties of this HC can also be changed (similar to the HCs for furfuryl alcohol). This intermediate surface area (~100 m²/gm) HC is also suitable for fast charging Li-ion and Na-ion batteries and capacitors.

Example 6

In yet another embodiment, we have mixed 105 gm of furfuryl alcohol (#from Sigma Aldrich, St. Louis, Mo.) with 10.5 gm of a mixture of oxalic acid, maleic acid and tartaric acid (in 1:1:1 molar ratios), along with 4.3 gm of Halloysite (Dragonite™ from Applied Minerals, Inc., New York, N.Y.) at room temperature. The Halloysite was first heated under air up to 750° C. to remove its structural water. As discussed earlier, the DTA data show that Halloysite undergoes a weight change (accompanied by an endothermic reaction) between 450° C. and 700° C. Beyond that temperature, further weight loss is negligible. Hence we have chosen 750° C. as the maximum temperature of treatment of the as-received Halloysite. The mixture was allowed to soak at room temperature, and once a pasty solid was formed, it was then heated at intermediate temperatures between 60° C. and 200° C., under air, to form a hard polymer. The polymer material was then carbonized under $N_2$ at 800° C. for 4 hours. XRD, Raman and $N_2$ isotherm (BET) data are shown in FIGS. 3, 4(b), and 5, respectively. The data are also presented in Table 4.

A strong $d_{002}$ peak is seen in the XRD data, with a 2theta value of 23.7° corresponding to a d-spacing of 3.75 Å. No other peaks are seen in the XRD, signifying that the original nano-tubular structure of Halloysite (with its typical XRD pattern showing several characteristic peaks) has been altered into an amorphous state by the heating profile (up to 1000° C.). The Raman spectrum also shows a strong D-band peak, indicating a non-graphitic carbon. A BET surface area of ~20 m²/gm is obtained and this can be further adjusted by controlling the polymerization and carbonization heating profiles. Finally, X-ray photoelectron spectroscopy (XPS) measurements on this HC showed the presence of Al and Si in the following ratios: $Al_{2p}$—with a peak at 74.65 eV, at 1.85 at. %; and $Si_{2p}$—with a peak at 103.39 eV at 1.72 at. %. Since all the major characteristics are similar to those discussed in the previous examples, it is expected that this HC will also perform similarly in Li-ion and Na-ion batteries and capacitors.

Example 7

Figure 9:
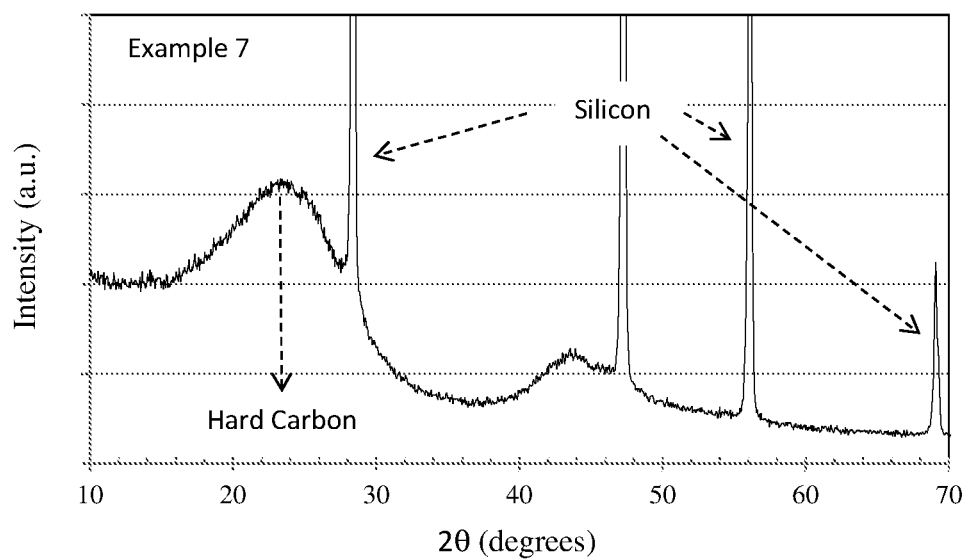
FIG. 9: XRD plot of hard carbon from Example 7, showing hard carbon and metallic Si.

In yet another embodiment, a HC/Si composite is synthesized from PFA. Specifically, 100 gm of PFA (FURO-LITE™, from Transfuran Chemicals bvba, Geel, Belgium) was mixed with 8.26 gm of −325 mesh metallic silicon powder (#215619, from Sigma Aldrich, St. Louis, Mo.), 5 gm of maleic acid and 2.5 gm of oxalic acid. The mixture was allowed to soak at room temperature until a pasty solid was formed, followed by heat treatment at temperatures between 60° C. and 200° C., under air, to form a hard solid polymer. The polymer was then carbonized at 800° C. for 4 hours under nitrogen, followed by a calcination treatment at 1000° C., also under nitrogen. XRD, Raman and $N_2$ isotherm (BET) data are shown in FIGS. 9, 4(b), and 5, respectively. The data are also presented in Table 4. Additionally, this HC was tested for Si content using the PIXE method (proton induced X-ray emission). PIXE measurements resulted in a 12.6 wt. % Si content. The XRD pattern in FIG. 9 clearly shows the presence of metallic Si, although the $d_{002}$ peak of the HC is also visible at 23.45°, corresponding to a d-spacing of 3.79 Å. The D-band peak in the Raman spectra also confirms the non-graphitic nature of this carbon. The addition of the Si powder results in a BET SSA value of 277 m2/gm. However, the poly furfuryl alcohol is still polymerized and carbonized into a non-amorphous hard carbon with an XRD $d_{002}$ spacing of >3.6 Å.

Example 8

In this embodiment, 105 gm of furfuryl alcohol (#W from Sigma Aldrich, St. Louis, Mo.) was mixed with 17 gm of $L_4Ti_5O_{12}$ (LTO, from MSE Supplies, Tucson, Ariz.), 4 gm of oxalic acid and 6 gm of maleic acid. Mixing was performed using an overhead stirrer to ensure a homogeneous mixture. The mixture was allowed to soak at room temperature till a pasty solid was formed. Next, it was heated at temperatures between 60° C. and 200° C., under air, until a hard solid polymer was formed. Carbonization was done by heating at 800° C. for 4 hours under nitrogen. The $N_2$ isotherm (BET) data for this carbon is shown in FIG. 5. A specific surface area of 131 m²/gm was measured for this HC, along with a pore volume of 0.0804 cc/gm. In this example we have shown that a non-amorphous hard carbon with embedded LTO material can be synthesized from furan-ring compounds by polymerizing with an organic acid catalyst—in the presence of the LTO dispersed in the precursor.

In this disclosure, we have described a process to synthesize non-graphitized, hard carbons from furfuryl-functional group containing precursors. The process involves mixing the ingredients and heating them under air, initially, followed by higher temperature heating under an inert atmosphere. This is overall a much simpler process than any previously described method to make hard carbons from furan—based precursors. Furthermore, we have shown that combinations of furan compounds can also be used, including furfuryl alcohol and furfural. Poly furfuryl alcohol resins are also a suitable precursor for this method, as is acetyl-furan. We have also synthesized non-amorphous hard carbons with Si and LTO—both good LIB anode materials on their own. Based on results obtained from XRD, we have shown that the $d_{002}$ peaks for all these HCs are generally above 3.6 Å, with most of them being >3.7 Å (a feature that is unique to hard carbons, and not activated carbons or graphite). From the Raman spectroscopy results we have shown that in all cases, there is a strong and prominent D-band peak, also signifying the presence of hard carbon. From the BET results we can identify the key processing parameters that affect the final BET surface area of the HCs. These parameters have been identifies as the polymerization and carbonization temperatures, and the heating rates. Finally, we have also shown that the HC synthesized using the methods described here are suitable for LIB and LIC anodes. We have tested two version of the HC with BET surface area of ~100 m²/gm and found excellent capacity when high charging currents are used (up to 100 C rates). This indicates good performance by these carbons for fast charging applications, including good cycle life. We have also shown HCs with BET SSA values as low as 2 m²/gm—synthesized from the same materials—using different processing parameters (specifically heat treatments). These low SSA HCs can overcome the high 1st cycle irreversible loss shown by the HC tested in example 1, and would also be suitable for high energy LIB devices.

Furthermore, we have synthesized HCs with embedded Si (in metallic Si powder form, and in the form of a Si compound—Halloysite). While the BET SSA increased with the HC/Si composite, the Raman and XRD data still indicate good potential for energy storage applications in LIB and LIC devices. Finally, we have also synthesized HCs with embedded LTO, which is also a promising anode material.

This application is not limited to particular methodologies or the specific compositions described herein, and as such, may vary. It is also to be understood that the terminology used herein is for the purpose of describing particular embodiments only, and is not intended to be limiting, since the scope of the present application will be limited only by the appended claims and their equivalents.

We claim:

1. A method of producing a non-amorphous hard carbon from a furan ring containing compound, comprising:
   a. mixing an acidic catalyst with a liquid furan ring containing compound to form a mixture, wherein the furan ring compound contains a 5 membered ring with 4 carbon atoms and 1 oxygen atom;
   b. soaking the mixture at room temperature and further heating the mixture between 25° C. and 200° C. to form a solid polymer; and
   c. heating the solid polymer between 200° C. to 1100° C. under inert atmosphere, to carbonize it to obtain the non-amorphous hard carbon, wherein the non-amorphous hard carbon has a $d_{002}$ spacing of greater than 3.6 Angstroms, as measured by an X-ray diffraction techniques, and a specific surface area between 2 and 200 $m^2/g$.

2. The method of claim 1, wherein the furan ring containing compound is at least one of a furfuryl alcohol, furfuraldehyde, 5-hydroxymethylfurfural, 5-methylfurfural, and poly furfuryl alcohol.

3. The method of claim 1, wherein the acidic catalyst is at least one of an organic acid with a pKa value greater than that of an oxalic acid, wherein the catalyst is a solid or dissolved in a deionized water to make a solution.

4. The method of claim 1, wherein the non-amorphous hard carbon has a density of greater than 1 gm/cc.

5. The method of claim 1, wherein the non-amorphous hard carbon has a 'D' band peak in its Raman spectra between 1300/cm and 1360/cm when measured using a 532 nm laser source.

6. The method of claim 1, wherein the carbonization is done between 2 hours-24 hours and the temperature ramp rate is between V° C./min and 5° C./min to affect the specific surface area of the non-amorphous hard carbon.

7. The method of claim 1, wherein the non-amorphous hard carbon is used for constructing electrodes for a Li-ion battery, a Na-ion battery, a Na-ion capacitor and a Li-ion capacitor, wherein the Li-ion battery, the Na-ion battery, the Na-ion capacitor and the Li-ion capacitor are charged and discharged at C/10 to-100 C rates.

8. The method of claim 1, wherein the furan ring containing compound is an acetylfuran and the acidic catalyst is at least one of a dichlorodimethylsilane and tetrachlorosilane.

9. A method of producing a silicon-containing non-amorphous hard carbon from a furan ring containing compound:
   a. mixing the furan ring containing compound with an insoluble silicon containing material and an acidic catalyst to make a mixture;
   b. soaking the mixture at room temperature and further heating the mixture from room temperature to 200° C. to form a solid polymer; and
   c. heating the solid polymer between 200° C. to 1100° C. under an inert atmosphere, to carbonize the solid polymer and make the silicon-containing non-amorphous hard carbon material, wherein the non-amorphous hard carbon has a $d_{002}$ spacing of greater than 3.6 Angstroms, as measured by an X-ray diffraction techniques, and a specific surface area between 2 and 200 $m^2/g$.

10. The method of claim 9, wherein the furan ring containing compound is at least one of a furfuryl alcohol, furfuraldehyde, 5-hydroxymethylfurfural, 5-methylfurfural, 2-acetylfuran and poly furfuryl alcohol.

11. The method of claim 9, wherein the acidic catalyst is at least one of an organic acid with a pKa value greater than that of oxalic acid, wherein the catalyst is a solid or dissolved in a deionized water to make a solution.

12. The method of claim 9, wherein the insoluble silicon compound is at least one of a metallic silicon powder and an aluminosilicate, wherein the aluminosilicate is a Halloysite.

13. The method of claim 9, wherein the silicon-containing non-amorphous hard carbon is used for constructing electrodes for energy storage devices.

* * * * *